May 14, 1963
E. G. JOHNSON
3,089,670
SOLAR POWERED VEHICLE
Filed Sept. 25, 1957
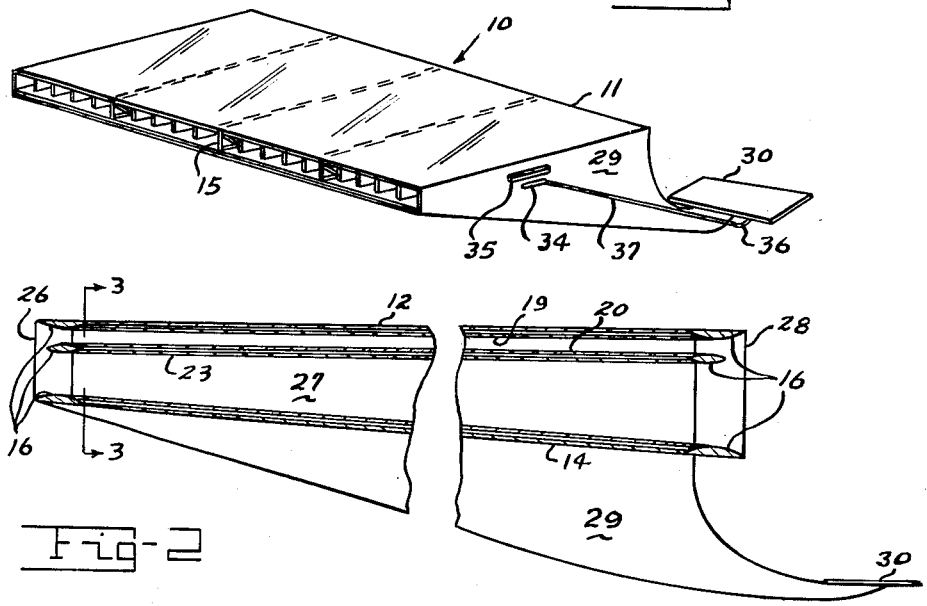
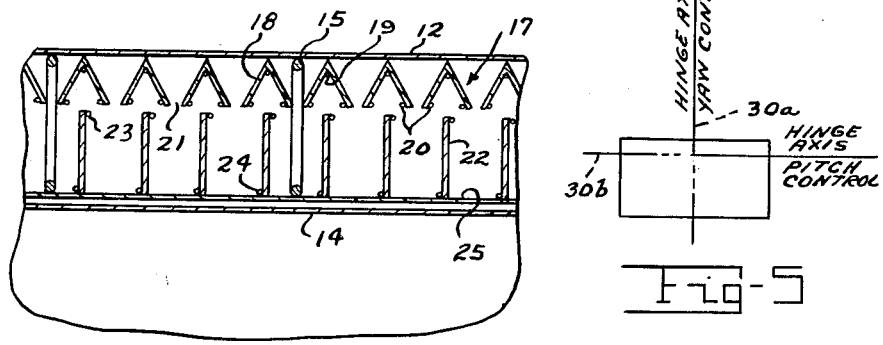
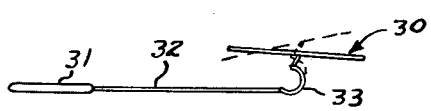
INVENTOR.
ELMER G. JOHNSON
BY Wade Koontz
Frank C. Leach Jr.
ATTORNEYS

United States Patent Office 3,089,670
Patented May 14, 1963

3,089,670
SOLAR POWERED VEHICLE
Elmer G. Johnson, 54 Grand Ave., Fairborn, Ohio
Filed Sept. 25, 1957, Ser. No. 686,264
6 Claims. (Cl. 244—74)
(Granted under Title 35, U.S. Code (1952), sec. 266)

The invention described herein may be manufactured and used by or for the United States Government for governmental purposes without payment to me of any royalty thereon.

This invention relates to an aircraft and its power plant and, more particularly, to a lift sustained flying vehicle consisting primarily of an airframe-propulsive unit and control system having its power derived through the conversion of solar radiation.

If intercepted outside the earth's atmosphere, solar radiation amounts to approximately .174 horsepower per square foot of area normal to the incident solar radiation. At any particular location in the earth's atmosphere, the magnitude of this radiation is a function of the latitude, the time of day, the time of year, and weather conditions. Considering all of these factors, the major requirement for a solar powered vehicle is that it be light enough in weight to sustain itself on the portion of the intercepted solar radiation energy that can be converted for propulsive purposes. The present invention satisfactorily meets this requirement.

While a solar vehicle may be operated at any altitude dependent upon the wing loading of the vehicle, it has been ascertained that a vehicle of this type may operate more satisfactorily at high speeds at high altitude. In fact, the combination of energy availability, energy conversion efficiency, aerodynamic-propulsive efficiency and speed for optimum performance is best realized in the altitude range of 100,000–300,000 feet. Under such conditions, the weight of the vehicle must be extremely small; in fact, the load per unit lifting surface of the vehicle at these altitudes is comparable to that of a toy model airplane. The structure of the vehicle must not only be extremely light in weight it must also be sufficiently strong to withstand the aerodynamic loads that will be encountered. However, these loads are very low; for example, at a speed of 1,000 miles per hour at an altitude of 240,000 feet, the structure of the aircraft is subject to an aerodynamic load comparable to that which would be exerted thereon at a speed of 10 miles per hour near sea level. Since it is desirable for an aircraft to carry a pay load, such as equipment to transmit data to the ground, for example, it is necessary that the weight of the aircraft structure be less than its wing loading capability.

An object of the present invention is to provide an air vehicle powered by solar energy.

Another object of this invention is to provide a power plant for an aircraft that derives its energy from the sun.

Other objects of this invention will be readily perceived from the following description.

This invention relates to a power plant for an aircraft or the like comprising an air ramjet, a solar radiation trap, means to absorb the radiation energy converting it into heat energy and transferring the heat energy to the air passing through the ramjet whereby the ramjet produces thrust.

The attached drawing illustrates a preferred embodiment of the invention, in which:

FIG. 1 is a perspective view of the aircraft and power plant of the present invention;

FIG. 2 is a sectional view, partly in elevation, of the aircraft of FIG. 1;

FIG. 3 is a sectional view taken along the line 3—3 of FIG. 2;

FIG. 4 is an elevational view of a control system for stabilizing means; and

FIG. 5 is a plan view of one of the stabilizing means.

Referring to the drawing and particularly FIG. 1, there is shown an aircraft 10 having a wing 11 of substantially rectangular shape although a swept wing could be employed, if desired. The wing 11 has an upper surface 12, which is substantially transparent to solar radiation. The material of the upper surface may be any material having a high tensile strength, a low specific weight, and substantially transparent to solar radiation. One material might be a polyester film having the trademark "Mylar" and made by the Du Pont Company; this material is substantially transparent to solar radiation and has the tensile strength of hardened aluminum but only half the specific weight. The lower surface 14 of the wing 11 is preferably made of the same material as the upper surface but it is coated or metalized by well known means to form a reflective surface.

The surfaces 12 and 14 of the wing 11 are joined together by a plurality of ribs 15. The ribs 15 form a truss-type structure and preferably are made of hollow tubular elements having stiffeners in the interior thereof to add strength thereto. The elements may be of any material having a high strength to weight ratio such as balsa wood, metals, or ceramics, for example. A plurality of braces 16 extends between the ribs 15 to add spanwise rigidity and function as anchor points for the upper and lower surfaces of the wing 11 and other structure of the aircraft 10. While the braces 16 are shown disposed only at the front and rear of the aircraft 10, it should be understood that they may be employed throughout the length of the chord of the wing.

The lower surface 14 of the wing 11 is at a predetermined angle with respect to the upper surface 12 of the wing. This particular angle is determined by the altitude at which the aircraft will fly, the Mach number, and the friction drag coefficient. The friction drag coefficient is a function of the Reynolds number of the flow over the wing 11. Since optimum results are obtained when the friction drag coefficient is equal to the wave drag coefficient, the particular angle of the lower surface 14 of the wing 11 with respect to the upper surface 12 is easily calculated.

In one type of operation of this vehicle, it is desired that the aircraft move at a speed relative to the earth at which it will maintain a position with respect to the sun such that a continuous supply of solar radiation energy may be intercepted for propulsive purposes. From the position of an observer on the sun, this requires the earth to rotate under the aircraft and the aircraft to remain with the atmosphere as the earth orbits about the sun. In this type of operation, the aircraft is in a position such that any equipment thereon may scan a large portion of the earth and transmit this observed data, for example. It should be noted that this aircraft does not depend on centrifugal force but on aerodynamic lift to remain in position.

A radiation trap 17, which is preferably of accordion shape, is disposed beneath the upper surface 12 of the wing 11 and adjacent thereto. While a radiation trap of this type is preferred, it will be understood that any type of trap providing a reasonable efficiency and extremely light in weight may be employed. The radiation trap 17 is formed of a plurality of angle-shaped members 18 made of a very thin metallic membrane. The angle-shaped members 18 are nontransparent to solar radiation and have a surface of good mirror qualities. One method of forming this metallic-like membrane is by dissolving "Mylar" from commercially metalized "Mylar." The metalized "Mylar" may be made by vaporizing metal under a vacuum by an electric arc in the vicinity of a sheet of "Mylar." The metal deposited upon the "Mylar" has a thickness depending upon the exposure time.

The metal of the metallic membrane, which is formed by dissolving the "Mylar" from the commercially metalized "Mylar," may be any metal having a high surface reflectivity, such as aluminum, of approximately .00006 inch thickness. The metallic membrane of aluminum could be formed from some other material by some process other than dissolving "Mylar," if desired.

The upper edges of the angle-shaped members 18 of the radiation trap 17 are supported by stressed steel wires 19, which are secured beneath the apexes of the angle members 18 and to the lower edges of the uppermost braces 16. The lower edges of the angle-shaped members 18 are supported by stressed steel wires 20, which are secured to the upper edges of the center braces 16, as shown in FIG. 2.

While the radiation trap 17 is shown as a geometrical type, it will be understood that the trap also could be based upon principles, which are classified as thermodynamic or optical. It is only necessary that the radiation efficiency of the trap be very high. This efficiency is defined as the ratio of the difference of the energy of the intercepted solar radiation and the energy lost due to reradiation to the energy of the intercepted solar radiation. The radiation trap is designed to minimize the value of the energy lost due to reradiation.

It should be understood that the incident solar radiation is composed of essentially parallel rays while the reradiation rays are randomly directed. The geometry of the structure of the radiation trap 17 is such that the incident solar radiation is focused through openings 21, which are formed between the lower edges of adjacent angle-shaped members 18. The maximum deviation of the sun's rays from parallel is an angle of seventeen minutes; this deviation is accounted for in the geometrical analysis of the radiation trap 17. It is necessary that the apex angle of the angle-shaped members 18 be extremely small for the radiation efficiency of the trap 17 to be high.

After passing through the openings 21, the incident solar rays are intercepted by an absorber, which includes a plurality of blackened plates 22. The plates 22 are supported at their upper ends by stressed steel wires 23, which are secured to the lower edges of the middle braces 16. The plates 22, which function as heat transfer fins, have their lower ends secured to stressed steel wires 24, which are secured to the upper edges of the lowermost braces 16. A flat plate 25, which is parallel to the lower surface 14 of the wing 11, is secured to the lower ends of the plates 22 and to the wires 24 (see FIG. 3). The plates 22 and the flat plate 25 of the radiation absorber are formed of a high temperature material such as chromium, for example. The plates are blackened to minimize the reflective qualities of the metallic membrane. Since the lower surface 14 of the wing 11 is reflective, any rays radiated downward by the plate 25 are reflected by the lower surface 14. After the absorber has been subjected to the rays of the sun, the temperature of the absorber increases sufficiently to insure that the metal behaves nearly as a "black body" regardless of the conditions of the surfaces of the plates 22 and 25.

The flat plate 25 and the transparent upper surface 12 of the wing 11 cooperate to form a ramjet therebetween. The forward spanwise braces 16 are appropriately shaped so that they function to provide the proper flow channel for a convergent inlet 26 to the ramjet. A passage 27, which is formed between the flat plate 25 and upper surface 12, diverges from the inlet 26 at the front of the wing toward the rear of the wing 11. When the vehicle is operating at supersonic speeds, the passage 27 also functions as a diffuser since a shock wave is genertaed at the convergent inlet 26 so that the speed of air flowing through the passage 27 is subsonic. The spanwise braces 16 at the rear of the wing 11 are shaped to form the proper flow channel for an exhaust outlet or nozzle 28 of the passage 27 of the ramjet. Since the outlet or nozzle 28, which is divergent, occupies the area of the airfoil that would otherwise be a blunt trailing edge, the wake drag, which normally occurs with an airfoil of this type, is eliminated.

A member 29 is secured to each side of the wing 11 and has stabilizing means including a member 30 pivotally secured thereto. Each of the members 30 is hinged to pivot about an axis 30a parallel to the longitudinal axis of the vehicle and an axis 30b parallel to the lateral axis. By pivotally connecting each of the members 30 about the axis parallel to the longitudinal axis of the vehicle, yaw control is provided. Similarly, the pivoting of the member 30 about the axis parallel to the lateral axis of the vehicle permits pitch control.

The actuation of the member 30 to provide pitch control may be accomplished through a tube 31, which is filled with ether, for example. This tube 31 preferably is disposed beneath the upper surface 12 and is disposed parallel to the longitudinal axis of the aircraft. The tube 31 is connected by a pressure line 32 (see FIG. 4) to an actuating member 33 including a Bourdon tube. The actuating member 33 is connected to the member 30 to pivot it about the axis 30b. The ether within the tube 31 has a certain predetermined temperature at which the member 30 will remain in the desired position to maintain the surface 12 normal to the rays of the sun. If the aircraft should pitch up or down, the heat energy of the solar radiation, which is intercepted by the ether within the tube 31, is reduced to thereby create a lower temperature of the ether. This reduces the volume of the ether and, accordingly, actuates the Bourdon tube of the actuating member 33 to exert a force on the control member 30 in a direction that produces an aerodynamic force on the aircraft to restore it to its proper flight attitude.

A tube 34, which contains ether, is secured to each member 29 and is shaded from the normal rays of the sun by a member 35, which is secured to the member 29 and extends therefrom at substantially right angles. The tube 34 is connected to an actuating member 36, which includes a Bourdon tube, by a pressure line 37. If the aircraft should yaw out of its normal flight path, one of the tubes 34 will be exposed to rays of the sun to thereby expand the ether within the tube. This results in the actuating member 36 moving the control member 30 about the hinge axis 30a.

This stabilizing mechanism insures that the upper surface 12 of the wing 11 remains substantially perpendicular to the rays of the sun and parallel to the airflow; this insures that the power produced by the ramjet is not substantially reduced. The yaw and pitch control systems also act as speed control means since the aircraft flies, for a given altitude, at an optimum speed that keeps the upper surface 12 of the wing 11 properly oriented with respect to the rays of the sun.

In the operation of the present invention, it will be readily seen that the rays of the sun pass through the radiation trap 17 into the radiation absorber wherein its plates 22 and 25 intercept the rays to absorb the solar energy thereof. This increases the temperature of the plates 22 and 25 of the absorber and makes possible the transfer of heat energy to the air flowing through the ramjet passage 27 in which the absorber is disposed. The resulting increase in the temperature of the air produces a thrust whereby the aircraft is propelled forward. The thrust produced by the air flowing through the ramjet increases in proportion to the increase in efficiency of the radiation trap 17. Likewise, an increase in the efficiency of the radiation absorber increases the thrust.

It is necessary to employ supplemental means to launch the aircraft to the altitude at which it is desired to operate. One method of furnishing auxiliary power to move the aircraft to its operating altitude includes the use of a balloon to take the aircraft to approximately 100,000 feet and a rocket powered carrier or platform to move the aircraft the remaining distance to its desired altitude and speed.

Since the aircraft depends solely on solar energy for its propulsion, there is no requirement for fuel and the aircraft may remain in the air indefinitely. Such an advantage permits the use of this device, for example, to continuously transmit physical data concerning conditions of state and constituents of the earth's atmosphere at high altitudes; to televise pictures of the earth's surface or its surrounding cloud formations.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A power plant for an aircraft or the like comprising a ramjet including an inlet and a divergent passage having an upper surface essentially transparent to solar radiation, the lower surface of said passage being at a predetermined angle to the upper surface, a solar radiation trap disposed adjacent the transparent upper surface of the passage and directing solar radiant energy into said divergent passage, and means disposed in the passage to absorb the solar radiation energy and to transfer said heat energy to the air passing through the passage whereby the ramjet produces a thrust.

2. An aircraft including a wing having an upper surface substantially transparent to solar radiation and a reflective lower surface, the lower surface of the wing being at a predetermined angle to the upper surface of the wing, a solar radiation trap disposed adjacent the upper surface of the wing to trap energy of solar radiation, a ramjet disposed between the surfaces of the wing, said ramjet having a passage formed between the upper surface of the wing and a lower wall parallel to the lower surface of the wing, and means within the ramjet passage to absorb heat directed thereto from said heat trap and to transfer heat energy obtained from the absorption of solar radiation to the air flowing through the ramjet to provide thrust to power the aircraft.

3. An aircraft including a substantially rectangular shaped wing having an upper surface substantially transparent to solar radiation and a reflective lower surface, the lower surface of the wing being at a predetermined angle to the upper surface of the wing, a solar radiation trap disposed adjacent the upper surface of the wing to trap energy of solar radiation, a ramjet disposed between the surfaces of the wing, said ramjet having a passage formed between the upper surface of the wing and a lower wall parallel to the lower surface of the wing and adapted to receive radiant energy transmitted by said heat trap, and means to transfer heat energy obtained from the absorption of solar radiation to the air flowing through the ramjet to provide thrust to power the aircraft.

4. An aircraft including a wing having an upper surface substantially transparent to solar radiation and a reflective lower surface, the lower surface of the wing being at a predetermined angle to the upper surface of the wing, a solar radiation trap disposed adjacent the upper surface of the wing to trap energy of solar radiation, means for absorbing solar radiation received from the heat trap, a ramjet disposed between the surfaces of the wing, said ramjet having a passage formed between the upper surface of the wing and a lower wall parallel to the lower surface of the wing, means to transfer heat energy obtained from the means for absorption of solar radiation to the air flowing through the ramjet to provide thrust to power the aircraft, and stabilizing means secured to the aircraft to maintain the upper surface of the wing substantially normal to the impinging sun rays.

5. A solar powered aircraft including a wing having an upper and a lower surface spaced apart to provide a chamber coextensive spanwise and chordwise of the wing and having a convergent inlet and divergent outlet and providing an unobstructed path for the flow of air therethrough, the upper surface of the wing being transparent to solar radiation and the lower surface of the wing being reflective to solar radiation, a radiation trap positioned beneath said transparent upper surface and heat absorbing means in said chamber adapted to receive heat energy from said radiation trap and to transfer heat to the air flow therethrough and induce ramjet action, the thrust produced propelling the aircraft.

6. An aircraft including a wing having an upper surface substantially transparent to solar radiation impinging thereon, a ramjet passage disposed between the upper and lower surfaces of the wing, a solar heat trap disposed beneath the transparent upper surface of the wing and directing the trapped solar energy into said ramjet passage, and heat absorbing and reradiating means within said ramjet passage absorbing the solar heat energy directed into said passage from the heat trap and transferring heat energy to the air flowing through the ramjet passage to thereby produce a thrust to propel the aircraft.

References Cited in the file of this patent

UNITED STATES PATENTS

| | | |
|---|---|---|
| 246,626 | Morse | Sept. 6, 1881 |
| 1,700,675 | Goddard | Jan. 29, 1929 |
| 2,467,885 | Freund | Apr. 19, 1949 |
| 2,680,437 | Miller | June 8, 1954 |
| 2,700,515 | Reder | Jan. 25, 1955 |
| 2,836,379 | Salmon | May 27, 1958 |
| 2,877,965 | Wakefield | Mar. 17, 1959 |
| 2,916,230 | Nial | Dec. 8, 1959 |

FOREIGN PATENTS

| | | |
|---|---|---|
| 748,700 | Great Britain | May 9, 1956 |